(12) United States Patent
Rolland et al.

(10) Patent No.: US 9,182,048 B2
(45) Date of Patent: Nov. 10, 2015

(54) SWITCHABLE PRESSURE LIMITING VALVE

(75) Inventors: Thomas Rolland, Gebhardshain (DE); Mike Heck, Daaden (DE)

(73) Assignee: Thomas Magnete GmbH, Herdorf (DE)

( * ) Notice: Subject to any disclaimer, the term of this patent is extended or adjusted under 35 U.S.C. 154(b) by 89 days.

(21) Appl. No.: 13/985,500

(22) PCT Filed: Mar. 31, 2012

(86) PCT No.: PCT/EP2012/001450
§ 371 (c)(1),
(2), (4) Date: Aug. 14, 2013

(87) PCT Pub. No.: WO2012/139717
PCT Pub. Date: Oct. 18, 2012

(65) Prior Publication Data
US 2013/0313456 A1 Nov. 28, 2013

(30) Foreign Application Priority Data
Apr. 12, 2011 (DE) .......................... 10 2011 016 819

(51) Int. Cl.
*F16K 31/06* (2006.01)
*F16K 17/04* (2006.01)
*F16K 17/06* (2006.01)

(52) U.S. Cl.
CPC ............. *F16K 31/06* (2013.01); *F16K 17/0453* (2013.01); *F16K 17/06* (2013.01); *F16K 31/0672* (2013.01)

(58) Field of Classification Search
CPC . F16K 17/0453; F16K 17/06; F16K 31/0655; F16K 31/0672
USPC ............. 251/129.04, 129.05, 129.07, 129.15, 251/129.17, 129.19; 303/119.2; 700/282, 700/287, 289
See application file for complete search history.

(56) References Cited

U.S. PATENT DOCUMENTS 4,383,234 A     5/1983   Yatsushiro et al.
4,932,430 A *   6/1990   Fernstrom ....................... 137/85
(Continued)

FOREIGN PATENT DOCUMENTS

CN     1471617 A     1/2004
CN     101216125 A   7/2008
(Continued)

OTHER PUBLICATIONS

International Search Report for PCT/EP2012/001450 (in German and English), mailed Aug. 2, 2012; ISA/EP.
(Continued)

*Primary Examiner* — Matthew W Jellett
(74) *Attorney, Agent, or Firm* — Harness, Dickey & Pierce, P.L.C.

(57) ABSTRACT

A switchable pressure limiting valve with an electromagnet (1) and with a device (2) for opening and closing a passage for the fluid stream. The opening of the valve is determined by the balance of forces at the tappet (3) upon which the pressure force of the fluid at the P-connection (4), the pressure force of the fluid at the T-connection (13) and the forces of two springs (5) and (6) act. The force of the spring (6) is varied by means of the position of the armature of the electromagnet. When the pressure force at the P-connection (4) outweighs the sum of the other forces, the valve opens. The above-mentioned device for opening and closing is composed of a diaphragm (7) and of a sealing seat (12), and this diaphragm is tension-mounted sealingly between the magnetic pole (10) and the housing (21).

19 Claims, 3 Drawing Sheets

(56) References Cited

U.S. PATENT DOCUMENTS

| | | | |
|---|---|---|---|
| 5,265,843 A | 11/1993 | Kleinhappl | |
| 5,551,480 A * | 9/1996 | Tomatsu et al. | 137/625.29 |
| 8,955,822 B2 | 2/2015 | Parsons et al. | |
| 2011/0042476 A1* | 2/2011 | McAlister | 239/5 |
| 2011/0094589 A1* | 4/2011 | Jacob et al. | 137/1 |

FOREIGN PATENT DOCUMENTS

| | | |
|---|---|---|
| DE | 1025227 B | 2/1958 |
| DE | 3725590 A1 | 2/1989 |
| DE | 4404350 A1 | 8/1995 |
| DE | 102011016819 A1 | 10/2012 |
| EP | 1916460 B1 | 1/2009 |
| FR | 2906594 A1 | 4/2008 |
| GB | 2201755 A | 9/1988 |
| JP | 2001107909 A | 4/2001 |
| WO | WO-2008040907 A1 | 4/2008 |

OTHER PUBLICATIONS

Amendment filed Sep. 13, 2012 for counterpart PCT application PCT/EP2012/001450.

European Communication (German) dated Jan. 30, 2014 of a counterpart European application.

First Office Action mailed Jul. 17, 2014 for Chinese Patent Application No. 201280006967.X of a counterpart European application.

International Preliminary Report on Patentability and Written Opinion mailed Oct. 24, 2013 for PCT/EP2012/001450.

International Preliminary Report on Patentability for PCT/EP2012/001450 mailed Oct. 24, 2013.

Office Action for German Patent Application 12718904.1 dated Sep. 23, 2013.

Response to the European Communication (German) dated Jan. 30, 2014 of the counterpart European application.

* cited by examiner

SWITCHABLE PRESSURE LIMITING VALVE

CROSS-REFERENCE TO RELATED APPLICATIONS

This application is a U.S. National Stage Application of International Application No. PCT/EP2012/001450, filed Mar. 31, 2012 and published in Germany as WO 2012/139717 on Oct. 18, 2012. This application claims the benefit of German Application No. 10 2011 016 819.2, filed Apr. 12, 2011. The disclosures of the above applications are incorporated herein by reference.

FIELD

The present disclosure relates to a switchable pressure limiting valve.

BACKGROUND

This section provides background information related to the present disclosure which is not necessarily prior art.

Pressure limiting valves are presupposed to be known, a switchable pressure limiting valve having been described in EP 1 916 460 B1. The publications JP 2001 107 909 A and FR 2 906 594 A1 show electrically continuously adjustable pressure limiting valves.

SUMMARY

This section provides a general summary of the disclosure, and is not a comprehensive disclosure of its full scope or all of its features.

The object of this disclosure is to develop further the technical teaching of this patent so that the valve can be used even with aggressive and heavily soiled liquids.

Other objects which the patent EP 1 916 460 B1 achieves, to be precise that of making the pressure to be limited switchable, that of reducing the influence of the coil temperature upon the regulating pressure, that of lessening the influence of the supply voltage and that of making it possible to have a low holding current, are still retained for the purpose of further development.

In the case of the liquids to be used here, it is necessary to carry out complete media separation between the armature space of the magnet and the spaces wetted by said liquid. For this purpose, the most suitable is a media-separating diaphragm, all other known methods of media separation, such as dynamic seals or a displacement of the armature into the liquid space, having proved less suitable.

Dynamic seals cause mechanical friction and experience wear under the influence of the soiled liquid. Displacing the armature into the liquid space and media separation around the armature by means of a bowl made from thin nonmagnetic material do not protect the armature against the aggressive and soiled liquid, friction and wear occur in the armature mounting, and the contact faces undergo wear when the armature impinges onto the magnetic pole.

The use of a diaphragm in a mechanical pressure limiting valve is known, for example, from the publications DE 1025227 B, DE 44 04 350 A1 and GB 2 201 755, and the use of a diaphragm in a switching valve is also known from the publication U.S. Pat. No. 5,265,843 A, but without a pressure regulating function.

The diaphragm is used here as a sealing body and is pressed against a sealing seat by a tappet. The pressure forces of the fluid act against the tappet.

With a diaphragm which is used for media separation, it is advantageous to limit the mechanical load upon the diaphragm. This is achieved, according to the disclosure, in that the armature of the magnet does not impinge onto the diaphragm directly or indirectly (via the tappet), but instead merely tensions to a greater or lesser extent a spring which in turn presses onto the diaphragm by means of a tappet.

Depending on whether the aim is to change over between two different regulating pressures or to switch the regulating function on and off, a second spring can act codirectionally upon the tappet or it can press the tappet towards the armature contradirectionally. In the latter case, the valve can be open additionally without appreciable pressure at the P-connection if the opening spring is stronger than the closing spring.

The armature, at the end of its forward movement, impinges onto the magnetic pole or onto a nonmagnetic stop disk which lies on the magnetic pole. As a result of this impingement of the armature, the force upon the tappet is not dependent on the magnetic force, but is only a function of the armature stroke and of the spring rigidity. This is advantageous in much as, when the magnet is activated by means of the on-board voltage of a vehicle, the magnetic force is dependent on this on-board voltage and on the magnet temperature. Even if the magnet is activated by a regulated current, there is still an advantage in terms of the accuracy of the force, because the forces of a plurality of electromagnets have a greater spread than the spring forces of a plurality of springs.

When the armature impinges directly onto the magnetic pole, the generation of magnetic retentivity must be kept low by a suitable choice of the materials of the armature and of the magnetic pole. If a nonmagnetic stop disk is used, this should be very thin so that the residual air gap of the electromagnet can also be small, thus resulting in a low holding current being necessary.

A variant can also be implemented in which the armature, in the dead state of the magnet, bears against the front stop facing the tappet and, in the live state, assumes the rear position facing away from the tappet. A further spring is then used which presses the armature against the front stop in the dead state of the magnet. The functioning of this variant differs from the above-described variant only in the assignment of the regulating pressures to the switching states, the higher regulating pressure arising here in the dead state.

With the small residual air gap in the switched-on state, a low holding current through the coil is sufficient to hold the armature against the assigned stop. This holding current can be considerably lower than the current which is required at the commencement of the armature movement. Such a current profile is generated, for example, in a known way by electric activation composed of a set-value generator and of a current regulator. If the magnet is not to be activated by a regulated current, but by a controlled voltage, a set-value generator is combined with a controllable voltage divider which operates, for example, on the principle of pulse width modulation.

The valve according to the disclosure can be used for pressure limitation in plants with aggressive or soiled liquids, the magnitude of the limit pressure being capable of being influenced by the switching of the electromagnet.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
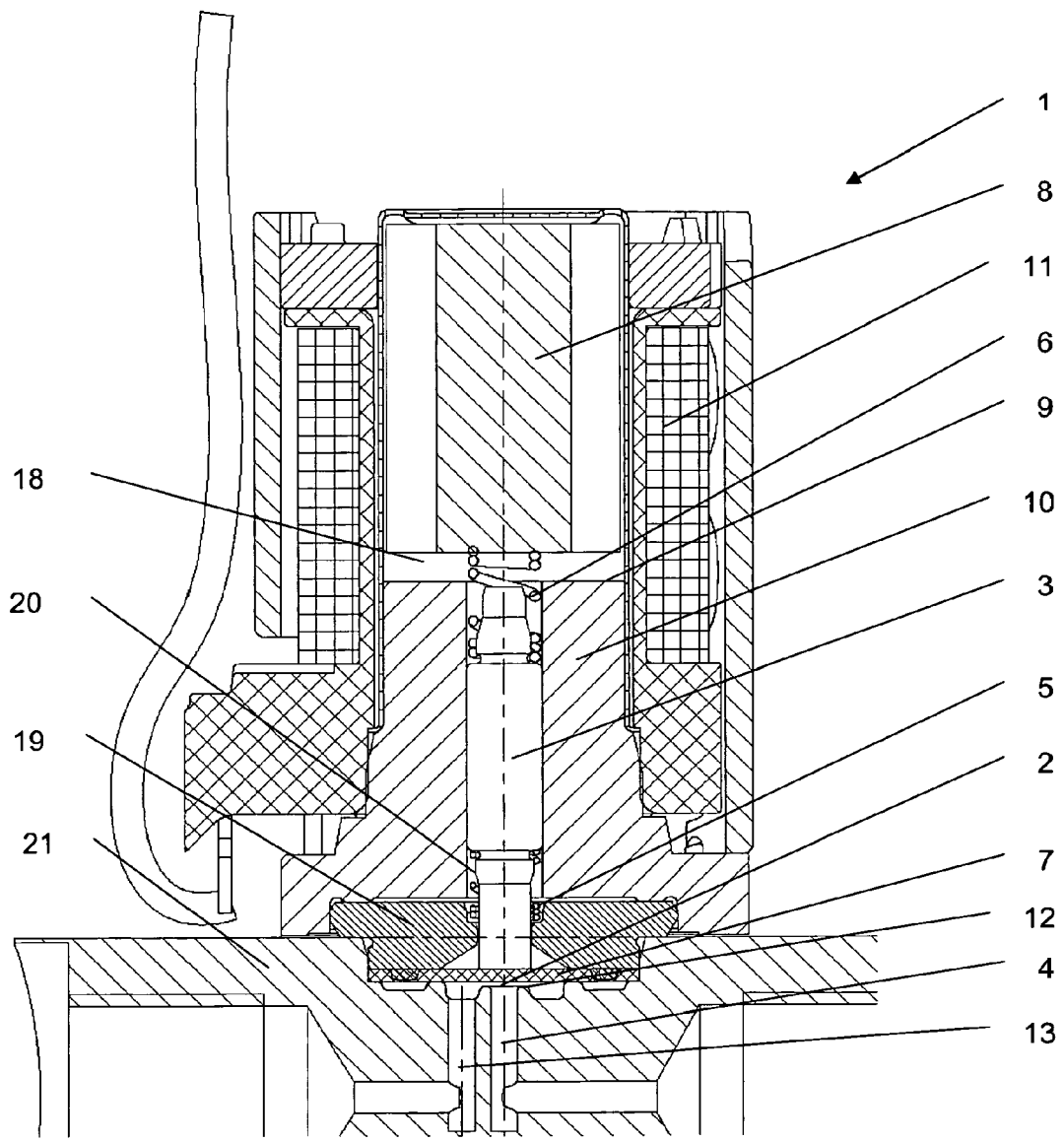
FIG. 1 is a cross-sectional view of a switchable pressure limiting valve with a pressing magnet.

FIG. 1 shows the switchable pressure limiting valve with its electromagnet 1. Contained in it is a coil 11 which, in the live state, generates a magnetic flux which gives rise at the air gap between the armature 8 and the magnetic pole 10 to a force which moves the armature 8 toward the stop 9. In this case, the armature 8 tensions the spring 6 to a greater extent, and this spring presses onto the tappet 3. The spring 6 is designed such that, in the case of the design current through the coil 11, said spring 6 enables the armature 8 to reach the stop 9 and to tension the spring 6 by the amount of an excursion having narrow tolerance. Consequently, when the coil 11 is live, the force of the spring 6 is independent in magnitude of the exact value of the current, and the minor fluctuations of this current which are caused by the coil temperature or by changes in supply voltage have no effect upon the force of the spring 6.

The tappet 3 is pressed by the spring 6 against the spring 5 and against the diaphragm 7, and the diaphragm 7 is additionally acted upon by the pressure of the fluid below the diaphragm 7. As long as the diaphragm 7 lies on the sealing seat 12, the pressure at the P-connection 4 acts with the inner face of the sealing seat 12 upon the diaphragm 7 and the pressure at the T-connection 13 acts with the outer annular face upon the diaphragm 7. The balance of forces at the diaphragm 7 and at the tappet 3 lying on it causes the valve to open or close, and if the pressure at the P-connection 4 overshoots a limit stipulated by the sum of the other forces, the valve opens and enables the fluid to flow from the P-connection 4 to the T-connection 13. As a result, the pressure at the P-connection 4 falls and the valve has a pressure-limiting action for the fluid at the P-connection 4.

The limit pressure for this pressure limiting function is influenced by the position of the armature 8, and when the electromagnet 1 is switched on the armature 8 bears against the magnetic pole 10, the spring 6 is tensioned to a greater extent, the force of the tappet 3 upon the diaphragm 7 is higher and the limit pressure which is established is likewise higher. When the magnet 1 is switched off, the armature 8 bears against the rear stop, the spring 6 is tensioned to only a slight extent and the limit pressure is correspondingly lower.

The diaphragm 7 fulfills two additional sealing-off functions, to be precise sealing between the T-connection 13 and the surroundings and sealing between the T-connection 13 and the working space of the tappet 20. So that the diaphragm 7 can fulfill these sealing-off functions, it is braced between a spacer disk 19 and the housing 21.

Figure 2:
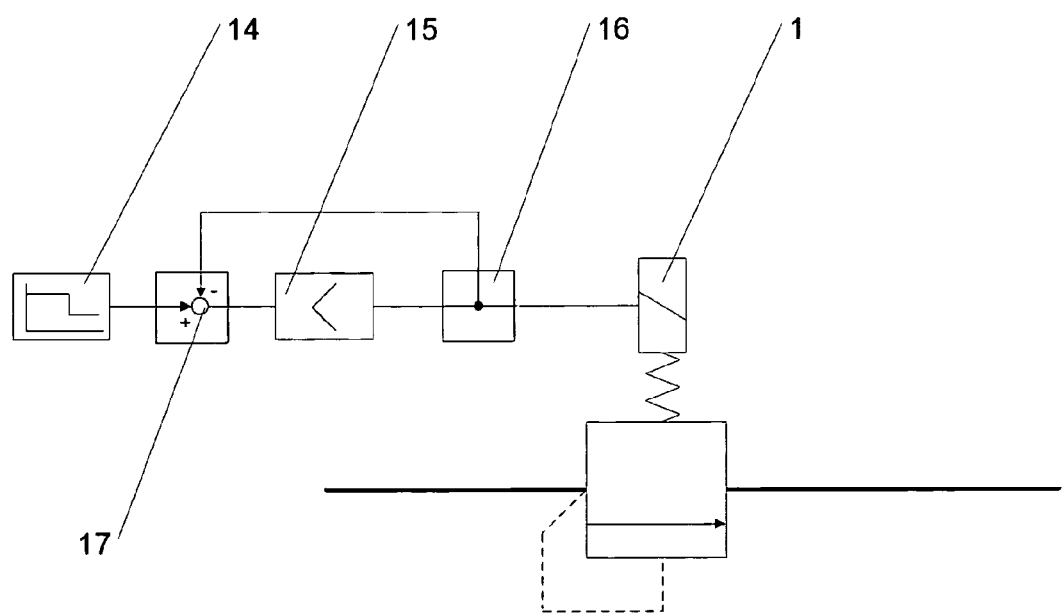
FIG. 2 is an illustration of electric activation, of the electromagnet.

FIG. 2 shows exemplary electrical activation of the electromagnet 1. In response to an external switching signal, the set-value generator 14 generates a time-variable set-value signal for the current. This set-value signal is compared in the comparator 17 with the actual-value signal of the current. According to the difference between the two signals, the switching controller 15 switches the voltage on or off. On account of the voltage, a current flows through the coil 11 of the electromagnet 1, said current being limited by the resistance and inductance of the coil 11. This current is measured in the current measurement device 16 and the result of this measurement is the actual-value signal.

After switch-on, the desired-value signal is at a higher value, for example 2A, for the first 50 ms, in order to bring about reliable and rapid movement of the armature 8. The desired value then falls to a markedly lower value, for example 0.5 A, which is still sufficient to hold the armature 8 against the stop 9, but avoids pronounced heating of the magnet coil 11 and high energy consumption.

Figure 3:
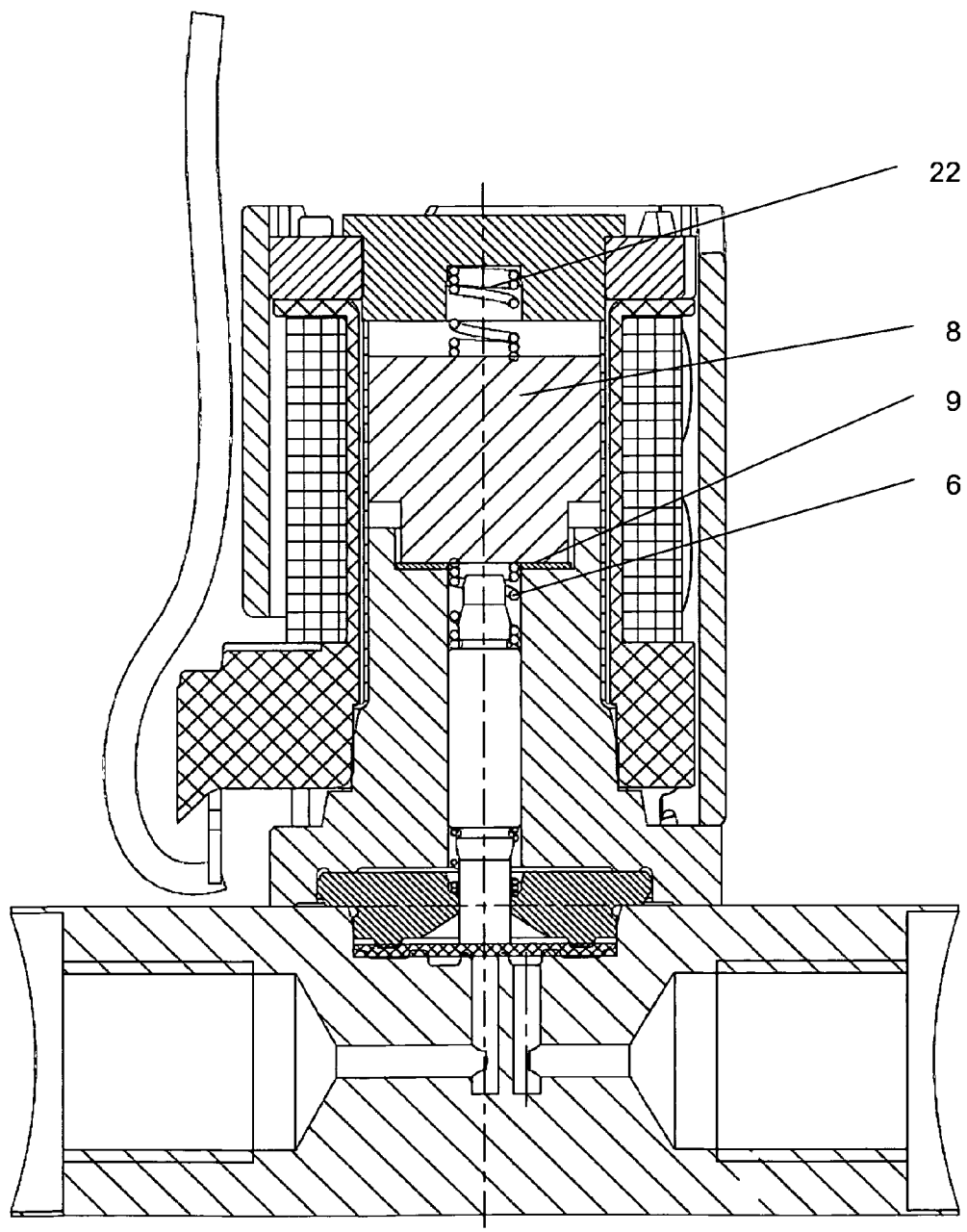
FIG. 3 is a cross-sectional view of a switchable pressure limiting valve with a pulling magnet.

FIG. 3 shows a second variant of the switchable pressure regulating valve with an armature 8 which, in the dead state of the magnet 1, is brought by the spring 22 to bear against the front stop facing the tappet 3. In this case, the spring 6 is tensioned. Once the magnet 1 becomes live, the armature 8 moves toward the rear stop and relieves the spring 6.

In comparison with the embodiment having a pressing magnet, a reversal of the function of the magnet 1 is obtained, all other functions of the valve remain the same. In the dead state of the magnet 1, the high limit pressure is established and, in the live state, the low limit pressure is established at the P-connection 4.

LIST OF REFERENCE SYMBOLS

1 Electromagnet
2 Device for opening and closing
3 Tappet
4 P-connection for the fluid
5 Spring
6 Spring
7 Diaphragm
8 Armature
9 Stop
10 Magnetic pole
11 Coil
12 Sealing seat
13 T-connection for the fluid
14 Set-value generator
15 Switching controller
16 Current measurement device
17 Comparator
18 Armature space
19 Spacer disk
20 Working space of the tappet
21 Housing
22 Spring The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A switchable pressure limiting valve comprising:
a housing that defines a sealing seat;
an electromagnet having an armature; and
a device for opening and closing a passage for a fluid stream between a P-connection and a T-connection, the device including:

a diaphragm mounted between the sealing seat and a spacer disk attached to the housing;
a tappet;
a first spring positioned between the tappet and the armature, the first spring applying a first force to the tappet; and
a second spring positioned between the tappet and the spacer disk, the second spring applying a second force to the tappet in a direction away from the diaphragm such that, in a switched-off state of the electromagnet, the diaphragm is positioned away from the sealing seat;
wherein opening of the valve is determined by a balance of forces at the tappet, a pressure force of the fluid at the P-connection, a pressure force of the fluid at the T-connection, and the first force of the first spring and the second force of the second spring acting upon the tappet, the valve opening when the pressure force at the P-connection outweighs the balance of the other forces,
wherein in a switched-on state of the electromagnet, the first force of the first spring is varied by a position of the armature relative to the tappet, and
wherein the armature of the electromagnet does not impinge onto the diaphragm, but tensions to a greater or lesser extent the first spring which in turn presses the tappet against the diaphragm such that the diaphragm is urged toward the sealing seat.

2. The pressure limiting valve as claimed in claim 1, wherein the first and second springs act upon the tappet in opposite directions, and in the switched-off state of the electromagnet, the force of the second spring is higher than the force of the first spring.

3. The pressure limiting valve as claimed in claim 1, wherein, in the switched-on state of the electromagnet, the first spring presses the diaphragm in a direction of the sealing seat via the tappet, and the second spring enables the armature of the magnet to move forward to a mechanical stop.

4. The pressure limiting valve as claimed in claim 3, wherein, in the switched-on state of the electromagnet, the armature impinges against a nonmagnetic disk, a thickness of which is about 0.1 mm.

5. The pressure limiting valve as claimed in claim 3, wherein, in the switched-on state of the electromagnet, the armature impinges against a magnetic pole.

6. The pressure limiting valve as claimed in claim 1, wherein, in the switched-on state of the electromagnet, the armature presses against a third spring and relieves the first spring, in the switched-off state of the electromagnet the third spring pressing the armature against a step and loads the first spring.

7. The pressure limiting valve as claimed in claim 1, wherein a coil of the electromagnet is configured to receive electrical power having a pulse width modulated voltage that after switch-on the voltage, is set at a value of about 12 V for a period of about 50 ms and then is set at a lower value that is sufficient to hold the electromagnet.

8. The pressure limiting valve as claimed in claim 1, wherein a coil of the electromagnet is configured to receive electrical power having a regulated average current,
after switch-on, a value for the current being a value of about 2 A that is set by a set-value generator for a period of about 50 ms, and then is set at a lower value that is sufficient for holding the electromagnet,
regulation of the current takes place by measurement of the current by a current measurement device, a comparator compares the measured current with a variable desired value, and a switching controller sets the current for the coil.

9. A switchable pressure limiting valve comprising:
a housing that defines a sealing seat;
an electromagnet having an armature; and
a device for opening and closing a passage for a fluid stream between a P-connection and a T-connection, the device including:
a diaphragm mounted between the sealing seat and a spacer disk attached to the housing;
a tappet that directly contacts the diaphragm;
a first spring positioned between the tappet and the armature; and
a second spring positioned between the tappet and the spacer disk;
wherein opening of the valve is determined by a balance of forces at the tappet, a pressure force of the fluid at the P-connection, a pressure force of the fluid at the T-connection, and the first force of the first spring and the second force of the second spring acting upon the tappet, the valve opening when the pressure force at the P-connection outweighs the balance of the other forces,
wherein the armature of the electromagnet tensions to a greater or lesser extent the first spring which in turn presses the tappet against the diaphragm such that the diaphragm is urged toward the sealing seat.

10. The pressure limiting valve of claim 9, wherein the first spring applies a first force to the tappet in a direction toward the diaphragm; and the second spring applies a second force to the tappet in a direction away from the diaphragm.

11. The pressure limiting valve of claim 9, wherein the second force of the second spring is varied by a position of the armature of the electromagnet.

12. A switchable pressure limiting valve comprising:
a housing having a sealing seat;
an electromagnet having an armature; and
a device for opening and closing a passage for a fluid stream between a P-connection and a T-connection, the device including:
a tappet having a first spring and a second spring; and
a diaphragm mounted between the sealing seat of the housing and either a magnetic pole or a spacer disk attached to the housing,
wherein opening of the valve is determined by a balance of forces at the tappet, a pressure force of the fluid at the P-connection, a pressure force of the fluid at the T-connection, and a force of the first spring and a force of the second spring acting upon the tappet, the valve opening when the pressure force at the P-connection outweighs the balance of the other forces, wherein the force of the second spring is varied by a position of the armature of the electromagnet,
wherein the armature of the electromagnet does not impinge onto the diaphragm, but tensions to a greater or lesser extent the second spring which in turn presses the diaphragm toward the sealing seat by the tappet, and
wherein, in a switched-on state of the electromagnet, the armature presses against a third spring and relieves the second spring, and, in a switched-off state of the electromagnet, the third spring presses the armature against a stop and loads the second spring.

13. The pressure limiting valve as claimed in claim 12, wherein the first and second springs act upon the tappet in opposite directions, and in a switched-off state of the electromagnet, the force of the first spring is higher than the force of the second spring.

14. The pressure limiting valve as claimed in claim 12, wherein the first and second springs act upon the tappet in the same direction.

15. The pressure limiting valve as claimed in claim 12, wherein, in the switched-on state of the electromagnet, the second spring presses the diaphragm in a direction of the sealing seat via the tappet, and the second spring, enables the armature of the magnet to move forward to a mechanical stop.

16. The pressure limiting valve as claimed in claim 15, wherein, in the switched-on state of the magnet, the armature impinges against a nonmagnetic disk, a thickness of which is about 0.1 mm.

17. The pressure limiting valve as claimed in claim 15, wherein, in the switched-on state of the magnet, the armature impinges against the magnetic pole.

18. The pressure limiting valve as claimed in claim 12, wherein a coil of the electromagnet is configured to receive electrical power having a pulse width modulated voltage that, after switch-on the voltage, is set at a value of about 12 V for a period of about 50 ms and then is set at a lower value that is sufficient to hold the electromagnet.

19. The pressure limiting valve as claimed in claim 12, wherein a coil of the electromagnet is configured to receive electrical power having a regulated average current,
   after switch-on, a value for the current being a value of about 2 A that is set by a set-value generator for a period of about 50 ms, and then is set at a lower value that is sufficient for holding the electromagnet,
   regulation of the current takes place by measurement of the current by a current measurement device, a comparator compares the measured current with a variable desired value, and a switching controller sets the current for the coil.

* * * * *